United States Patent
Mizuta et al.

(10) Patent No.: US 7,579,111 B2
(45) Date of Patent: *Aug. 25, 2009

(54) FILM-COVERED ELECTRIC DEVICE HAVING PRESSURE RELEASE OPENING

(75) Inventors: Masatomo Mizuta, Tsukuba (JP); Hiroshi Yageta, Tsukuba (JP); Makihiro Otohata, Tsukuba (JP); Kiyokazu Oikawa, Tsukuba (JP); Toshihiko Mankyu, Tsukuba (JP)

(73) Assignee: NEC Corporation, Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 11/831,209

(22) Filed: Jul. 31, 2007

(65) Prior Publication Data
US 2008/0008936 A1    Jan. 10, 2008

Related U.S. Application Data

(63) Continuation of application No. 11/034,715, filed on Jan. 14, 2005, now Pat. No. 7,267,906.

(30) Foreign Application Priority Data
Jan. 16, 2004    (JP) .............................. 2004-009230

(51) Int. Cl.
*H01M 2/12* (2006.01)
(52) U.S. Cl. ........................................ 429/185; 428/76
(58) Field of Classification Search .................. 428/68, 428/76, 136, 138; 429/185, 56, 53, 55
See application file for complete search history.

(56) References Cited

U.S. PATENT DOCUMENTS

| 4,678,725 A | 7/1987 | Kikuchi et al. |
| 5,942,351 A * | 8/1999 | Van Lerberghe ............. 429/55 |

FOREIGN PATENT DOCUMENTS

| JP | 10-55792 A | 2/1998 |
| JP | 11-97070 A | 4/1999 |
| JP | 2000-100399 A | 4/2000 |
| JP | 2001-222986 A | 8/2001 |
| JP | 2002-56835 A | 2/2002 |
| JP | 2003-132868 A | 5/2003 |

* cited by examiner

*Primary Examiner*—Alexander Thomas
(74) *Attorney, Agent, or Firm*—Sughrue Mion, PLLC

(57) ABSTRACT

A film-covered electric device has an electric device element and casing films. The casing films include a sealing area formed by thermally fusing the facing surfaces of the casing films together around the periphery of the electric device element, an electric device element receiving part encapsulating the electric device element inside the sealing area, and unfused portions formed in the shape of cove communicating with the electric device element receiving part. The casing films further include a stress concentrating portion touching the unfused portions for concentrating thereon the peeling stress of the casing films generated at the sealing area by the expansion of the electric device element receiving part, and a pressure releasing part is formed in the stress concentrating portion.

12 Claims, 7 Drawing Sheets

FILM-COVERED ELECTRIC DEVICE HAVING PRESSURE RELEASE OPENING

The application is a continuation of Ser. No. 11/034,715 filed Jan. 14, 2005, now U.S. Pat. No. 7,267,906.

BACKGROUND OF THE INVENTION

1. Field of the Invention

The present invention relates to a film-covered electric device in which casing films encapsulate therein an electric device element, such as a battery and a capacitor.

2. Description of the Related Art

Recently, there has been a growing demand for lighter weight and thinner dimension of a battery as a power source for portable equipment or the like. As a casing for the battery, a laminated film structure has been increasingly used instead of a conventional metallic can, because the laminated film structure is possible to achieve lighter weight and thinner dimension and have flexibility in forming shapes, compared with the metallic can, which has some limitations in achieving lighter weight and thinner dimension with less flexibility. The laminated film includes a metallic thin film layer or metallic foil and thermo-fusing resin film layers.

The laminated film structure used in the battery casing typically includes a thermo-fusing resin film as a heat-sealing layer laminated on one side of metallic thin film made of aluminum, and a protection film laminated on the other side.

In the film-covered battery using the laminated film as a casing, a battery element generally including a positive electrode, a negative electrode and an electrolyte, is enclosed by the casing so that the thermo-fusing resin film can face inwardly each other, and the casing is thermally fused at the periphery of the battery element to form airtight sealing structure (hereinafter simply referred to as "sealing"). There may be employed, for example, polyethylene or polypropylene film for the thermo-fusing resin film, and nylon or polyethylene-terephthalate film for the protection film. The battery element has positive and negative electrode leads connected with the positive and negative electrodes, respectively, for drawing them outside the casing. When sealing the battery element, these electrode leads are protruded from the casing, and then the casing is thermally fused.

If a voltage over a rated range is applied to a battery during use of the battery, electrolytic solution is possible to be electrolyzed to generate gas, and the rise of pressure inside the battery results. If the battery is used at a high temperature over a rated range, electrolysis of electrolyte base or the like also causes to produce gas generating substance. The use of a battery within the rated range is basically ideal for preventing gas generation. However, if failure of a control circuit for the battery occurs due to some causes, and a resultant abnormal voltage is applied or surrounding temperature abnormally rises, large quantities of gas may be possibly generated.

The gas generation inside the battery causes the pressure inside the battery to be raised. Extreme rise of the inside pressure is possible to cause the battery to be exploded if worst comes to worst. In order to avoid the explosion of the battery, the battery using a metal can as the casing generally has a pressure relief valve for releasing the gas outside the battery when the pressure inside the battery goes up. However, the film-covered battery, which uses the casing films, is difficult to adopt a pressure relief valve because of its structure. When the inside pressure excessively goes up in the film-covered battery, the casing films expand, and finally explodes to eject the gas from a broken position, which is possible to affect surrounding equipment according to the broken position, because it is difficult to determine the position to break.

In order to solve the problem due to gas generation inside the battery, in a conventional film-covered battery, Japanese Laid-Open Patent Publication No. 2000-100399 discloses a film-covered battery in which a battery element is sealed under a condition that a part of thermally fused portion is set to lower temperature than the other part. Japanese Laid-Open Patent Publication No. 11-97070 discloses another film-covered battery in which a part of thermally fused portion has been made with thermally non-fusible resin sheet intervened. In both examples, a part of the casing has been made with lower thermo-fusing strength of films, the part acting as a safety valve.

Further, Japanese Laid-Open Patent Publication No. 2002-56835 discloses a structure in which a part of thermally fused portion is cut off from outside. Japanese Laid-Open Patent Publication No. 10-55792 discloses another structure in which a part of a sealed side has an un-bonded portion that becomes smaller in width outward from the inside of the battery. Each of these structures has on the thermally fused portion a part where the width of the fused portion partially becomes narrower outward from the inside of the battery, the part functioning as a safety valve.

However, the structures for releasing the gas in the conventional film-covered batteries described above have a risk of trouble, such as the leakage of electrolyte, due to the deterioration of the thermally fused portion. Additionally, it has been difficult to adjust the thermo-fusing strength, that is, difficult to accurately set the release pressure at the time of occurrence of abnormality.

In order to realize practical release pressure using the above-described conventional structure which has the thermally fused portion with the width partially narrowed, the narrowed part functioning as a safety valve should have a very narrow fused width of, for example, 1 mm. This structure has caused the sealing reliability to be reduced, and the width error of fused portion at the time of manufacturing has greatly affected the release pressure, resulting in difficulty accurately setting the release pressure. The reason for necessitating such a narrow fused width is that: a film-covered battery tends to have weaker sealing strength at the area where electrode leads extend out for taking out current, and therefore the safety valve has to be opened in advance with substantially lower pressure in order to prevent gas release through the lead extending area.

The problem described above commonly arises not only in the batteries but also in film-covered electric devices in which an electric device element, having the possibility of generating gas, is sealed with casing films.

SUMMARY OF THE INVENTION

An object of the invention is to provide a film-covered electric device in which a release pressure at the time of film expansion due to abnormal gas generation is easily set without reducing the sealing reliability of an electric device element.

In order to achieve the object described above, the film-covered electric device according to the invention has an electric device element, and casing film arranged for enclosing the electric device element to seal it. The casing film include a sealing area formed by thermally fusing the facing surfaces of the casing film together throughout the perimeter of the casing film around the periphery of the electric device element, an electric device element receiving part formed inside the sealing area as a space for encapsulating the electric device element, and at least one unfused portion communicating with the electric device element receiving part, and having a shape of cove opening to the electric device element receiving part. The casing film further include a stress concentrating portion touching the unfused portion for concentrating thereon peeling stress of the casing film, the peeling stress being generated by expansion of the electric device element receiving part according to the rise of inside pressure of the electric device element receiving part, and a pressure release part formed within the stress concentrating portion for opening the inside of the electric device element receiving part to the outside thereof by peeling the casing film.

According to the film-covered electric device of the invention constructed as described above, since the casing film have cove-like unfused portion communicating with the electric device element receiving portion, when the inside pressure goes up due to gas generation from the electric device element, the generated gas enters the unfused portions to expand the casing film at the unfused portions. The expansion of films at the unfused portions causes peeling of the casing film at the stress concentrating portion so as to proceed in advance of the other portions of the sealing area. The stress concentrating portion has the pressure release part formed thereon, and therefore, when the peeling at the stress concentrating portion proceeds to reach the pressure release part, the inside of the electric device element receiving part becomes connected to the outside thereof. This connection permits the generated gas to be ejected through the pressure release part, thereby preventing unexpected explosion of the film-covered electric device. Release pressure can be easily set by adjusting the position of the pressure release part on the stress concentrating portion. Additionally, the stress concentrating portion functioning as a safety valve can have larger progress in peeling film than that of conventional structures, thereby allowing the pressure to be released by lower value than a conventional one, and improving the precision of setting the release pressure with less influence of positional error of the pressure release part.

Preferably, the sealing area is formed protruding into the area where the unfused portions are provided. With this structure, the sealing area necessary to seal the electric device element can be maintained sufficiently even at the area where the unfused portions are provided, and further can suppress ingress of water contained in the atmosphere through the end of the casing film.

Two unfused portions may be formed in a spaced relationship with each other along the periphery of the sealing area, and the stress concentrating portion can be positioned between these two unfused portions. With this structure, the peeling of films proceeds from both sides of the stress concentrating portion, so that the peeling effectively proceeds up to the pressure release part. The stress concentrating portion may be formed as a fused protrusion protruding toward the electric device element receiving part from the sealing area outside two unfused portions, or may be formed as an island-shaped fused portion positioned between two unfused portions.

According to the invention, the sealing area has cove-like unfused portions, and the stress concentrating portion is provided touching the unfused portions, so that the peeling of casing film can proceed in advance at the stress concentrating portion. Resultantly, the release pressure can be set easily and securely.

The above and other objects, features and advantages of the present invention will become apparent from the following description with reference to the accompanying drawings which illustrate examples of the present invention.

DESCRIPTION OF THE PREFERRED EMBODIMENTS

Figure 1:
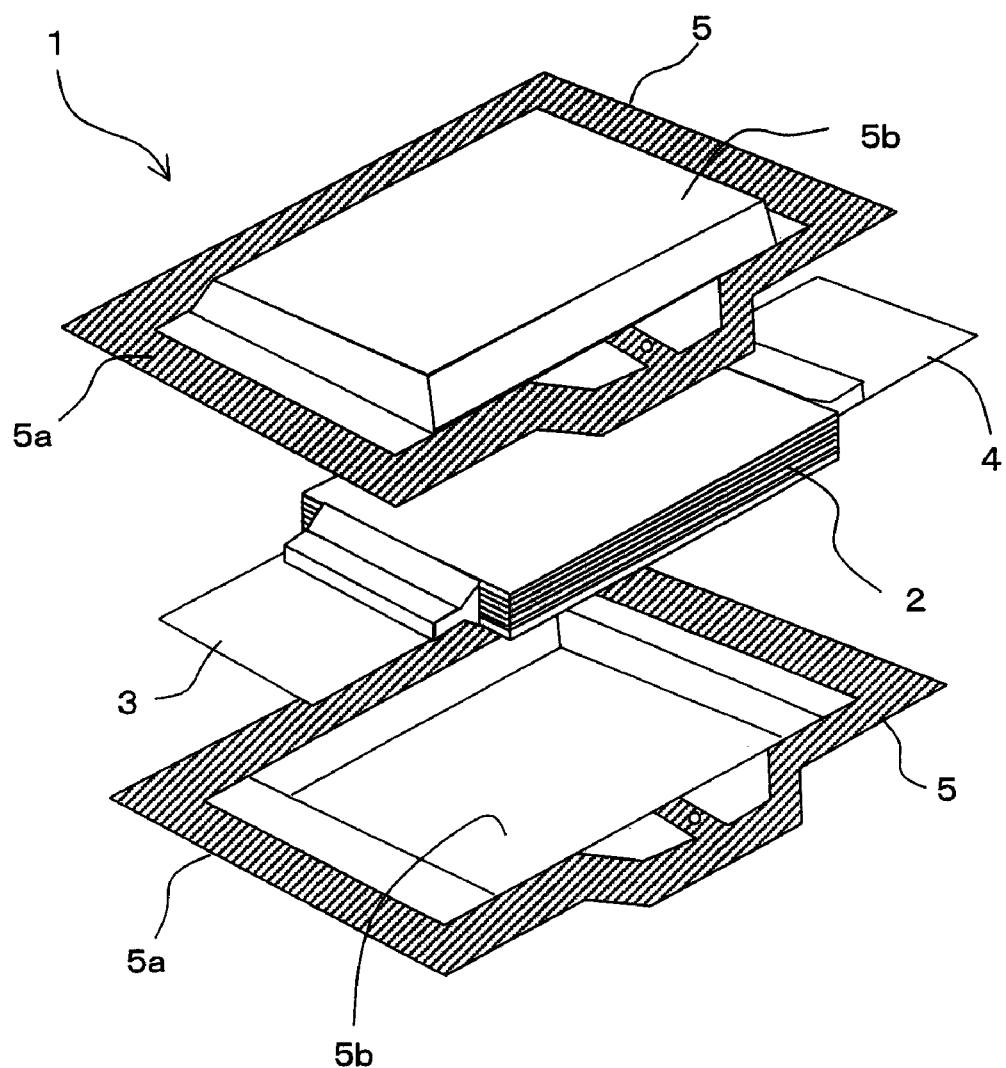
FIG. 1 is an exploded perspective view of a film-covered battery in accordance with one embodiment of the present invention.

Referring to FIG. 1, film-covered battery 1 includes flat and substantially rectangular parallelepiped battery element 2 having a structure with a plurality of positive electrodes and negative electrodes alternately stacked, positive electrode lead 3 and negative electrode lead 4 connected with the positive electrodes and negative electrodes of battery element 2, respectively, and casing films 5 for sealing battery element 2 with positive electrode lead 3 and negative electrode lead 4 partially extending out, thus constructing film-covered battery 1 according to one embodiment of the present invention.

Battery element 2 has a stacked body wherein the plurality of positive electrodes and negative electrodes alternately stacked with separators intervened, the electrodes being composed of metallic foils both sides of which respective electrode materials are applied onto. The stacked body, including the positive electrodes, negative electrodes and the separators, is impregnated with electrolyte to construct the battery element. Each of the positive electrodes and negative electrodes has an unapplied portion, where no electrode material is applied, protruding from one side. All unapplied portions of the positive electrodes and the negative electrodes are respectively united together, welded by ultrasonic technology, and then connected to positive electrode lead 3 and negative electrode lead 4, respectively. The positive electrodes and the negative electrodes are overlaid on one another with their unapplied portions opposing each other. Accordingly, positive lead 3 and negative lead 4 extend out from opposing sides of film-covered battery 1.

In a non-aqueous electrolyte battery such as a lithium-ion battery, aluminum foil is employed as a positive electrode metal, and copper foil as a negative electrode metal. An aluminum plate is used for positive electrode lead 3, and a nickel plate or copper plate for negative electrode lead 4. If the copper plate is used for negative electrode lead 4, nickel plating may be applied to its surface.

There can be employed for a separator a sheet type member, such as micro-porous film, non-woven fabric or fabric made of thermoplastic resin such as polyolefin, capable of impregnating electrolyte.

Casing film 5 is a laminated film, and a pair of casing films 5 is arranged so as to enclose battery element 2 by sandwiching it from both sides in its thickness direction. The opposing surfaces of the laminated films overlaid on each other around the periphery of battery element 2 are thermally fused together throughout the periphery of casing films 5 to seal battery element 2. This thermal fusing throughout the periphery of casing films 5 allows casing films 5 to have sealing area 5a formed thereon so as to enclose battery element 2 around the periphery, and also to have a battery element receiving part formed inside sealing area 5a as a space for encapsulating battery element 2. Sealing area 5a is hatched in FIG. 1. Each casing film 5 has cup 5b at its center area to form the battery element receiving part. This cup 5b can be formed by a deep drawing mold process. Although FIG. 1 shows an example in which cups 5b are formed on both casing films 5, cup 5b may be formed on either side of the films, or casing film 5 may encapsulate battery element 2 utilizing its flexibility without forming cup 5b.

The laminated film used in casing film 5 might be made of known films generally used in this type of film-covered battery, as long as they have flexibility and capability to seal battery element 2 without leakage of electrolyte. Typical layer structure of the laminated film used in casing film 5 may include a metallic thin film layer and a thermo-fusing resin layer stacked on each other, or a metallic film layer having a protective layer comprising a film made of polyester like polyethylene-terephthalate, nylon, or the like, laminated to the side opposite to where a thermo-fusing resin layer is stacked. When sealing battery element 2, the thermo-fusing resin layers face each other to enclose battery element 2.

The metallic thin film layer may be a foil having a thickness of 10-100 μm made of Al, Ti, Ti alloy, Fe, stainless steel, Mg alloy, or the like. There are no particular limitations regarding the resin used for the thermo-fusing resin layer, as long as it is thermally fusible. There may be employed, for example, polyester such as polypropylene, polyethylene, modifications of these resins, polyphenylene-sulfide and polyethylene-terephthalate, polyamide, ethylene-vinylacetate-copolymer, or the like. The thickness of the thermo-fusing resin layer is preferably 10-200 μm, and more preferably 30-100 μm.

A description will now be given of specific features in sealing area 5a of film-covered battery 1 with reference to FIG. 2.

Figure 2:
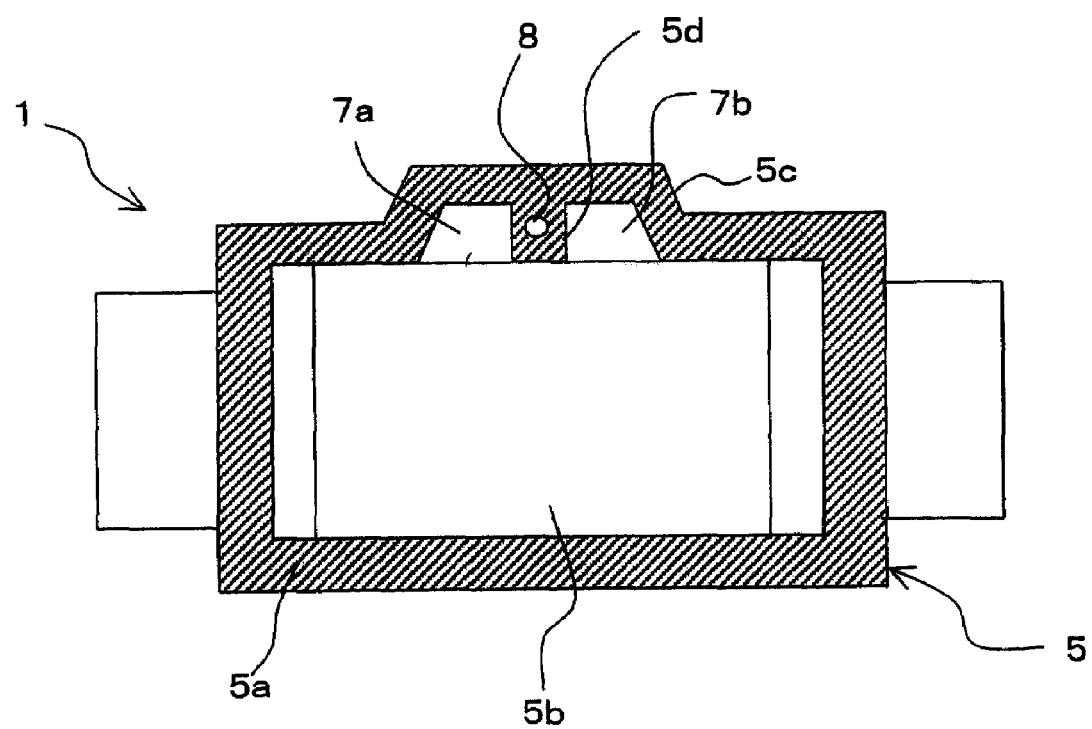
FIG. 2 is a plan view of the film-covered battery shown in FIG. 1.

As shown in FIG. 2, sealing area 5a has at one side two unfused portions 7a and 7b where casing films 5 are not thermally fused together, each portion having a shape of cove opening toward cup 5b (battery element receiving part) so as to communicate with cup 5b. According to the formation of cove-like unfused portions 7a and 7b, casing film 5 has a fused prominence 5c protruding outward at the position of unfused portions 7a and 7b so as to keep constant width of sealing area 5a throughout the periphery of the films. Two unfused portions 7a and 7b are arranged in a spaced relationship with each other along one side of sealing area 5a, and there is provided at the area between unfused portions 7a and 7b a fused protrusion 5d protruding toward cup 5b from sealing area 5a positioned outside unfused portions 7a and 7b. This fused protrusion 5d has through-hole 8 formed therein passing through casing films 5.

In film-covered battery 1 constructed as described above, if a voltage beyond a rated range is applied to the battery, or temperature rises temporarily during its use, battery element 2 generates gas, which causes the inside pressure of battery 1 to rise. The rise of inside pressure causes casing films 5 to expand in a dome shape, which acts on the thermally fused portions of casing films 5 to produce peeling stress. At this time, the peeling stress is concentrated on fused protrusion 5d between two unfused portions 7a and 7b, so that peeling at fused protrusion 5d proceeds in advance of other thermally fused portions of casing films 5. When this peeled area edge reaches the position of through-hole 8 as the inside pressure rises, the battery element receiving part communicates with the outside of film-covered battery 1, allowing the risen pressure to be released through through-hole 8. With this structure, the generated gas can be ejected from a predetermined position prior to explosion of battery 1, thereby preventing the breakage of battery 1 and the ejection of gas toward unexpected directions.

A detailed description will be given of advancement of the peeling of casing films 5 according to the rise of inside pressure.

Figure 3:
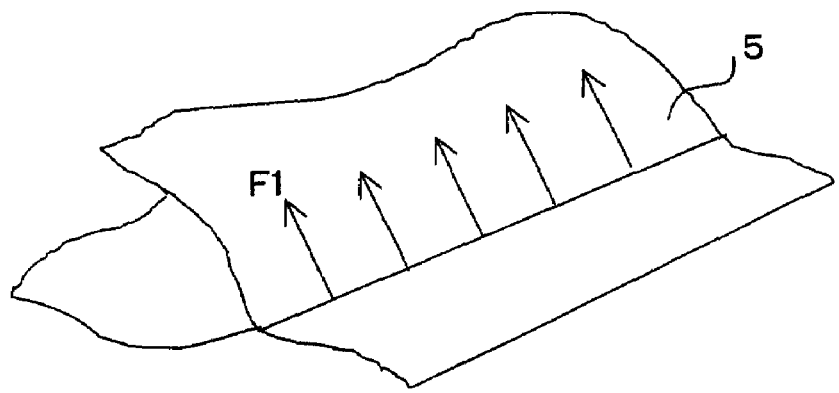
FIG. 3 is a perspective illustration explaining peeling stress acting near a boundary when the boundary of a thermally fused portion of casing films is a straight line without irregular shape.

If the border between the thermally fused portion and the unfused portion is a straight line without an irregular part, peeling stress F1 acts in one direction only as shown in FIG. 3, to thereby advancing the peeling of casing films 5 toward the rim thereof.

Figure 4:
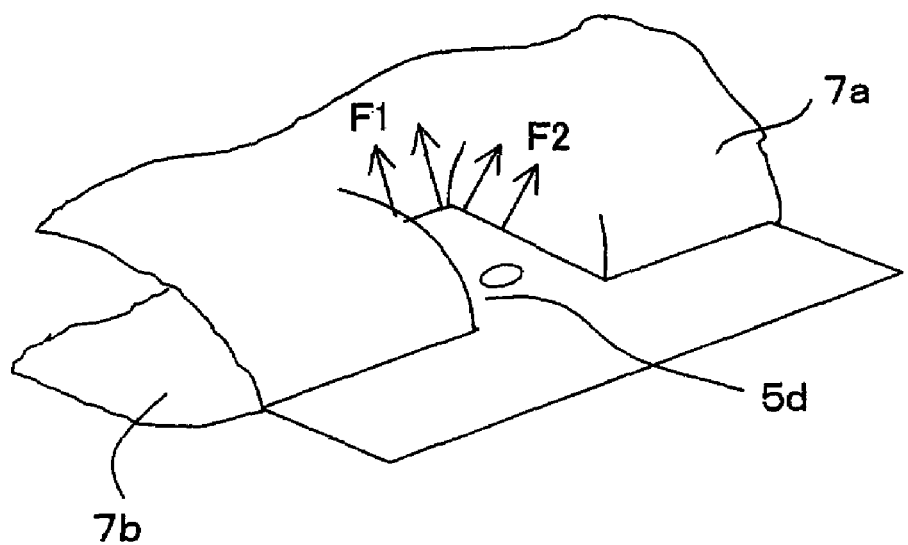
FIG. 4 is a perspective illustration explaining peeling stress acting on a fused protrusion shown in FIG. 2.

However, if fused protrusion 5d is provided as in the embodiment, unfused portions 7a and 7b are also filled with gas, thereby expanding casing films 5 at both sides of fused protrusion 5d as shown in FIG. 4. Therefore, fused protrusion 5d receives peeling stress F1 at the top end, and additionally peeling stress F2 at both sides ends. As a result, fused protrusion 5d receives larger peeling stress at the corners due to resultant forces, which causes the peeling of film 5 at the corners to proceed in advance of the other portions thereof. As the peeling of film 5 proceeds at the corners, the corners gradually become round, but fused protrusion 5d receives peeling stress from various directions, so far as protrusion 5d maintain convex shapes. Accordingly, the peeling of fused protrusion 5d proceeds in advance of the other portions of films 5, until protrusion 5d finally disappeared with the convex sharpness reduced.

Figure 5:
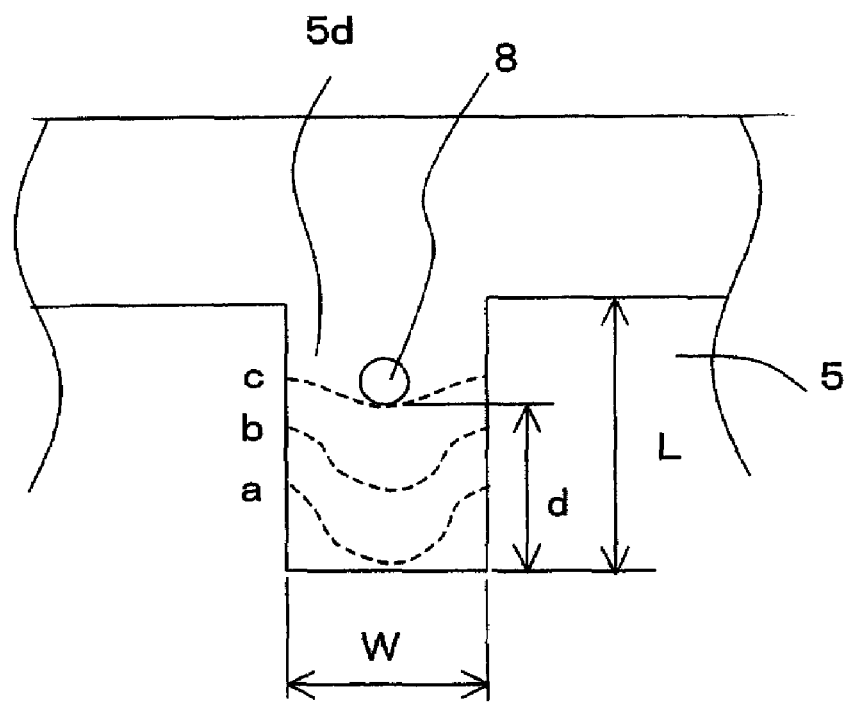
FIG. 5 is a plan view showing the peeling progress at the fused protrusion shown in FIG. 2.

FIG. 5 shows the progress of peeling of casing films 5 at fused protrusion 5d. As shown in FIG. 5, the peeling at protrusion 5d proceeds from both sides thereof to indicated positions a, b, and c in this order, as the inside pressure rises. The peeled position of casing films 5 depends on its material, width W of protrusion 5d, length L of protrusion 5d, and inside pressure. Therefore, if the material of film 5, width W and length L are decided in advance, release pressure can be arbitrarily set by adjusting the position of through-hole 8, the release pressure being an inside pressure of the battery element receiving part at the time of communication between the inside and outside thereof. If through-hole 8 is positioned nearer to the top end of protrusion 5d, the release pressure becomes lower, and if the through-hole 8 is positioned near the root of protrusion 5d, the release pressure becomes high.

In film-covered battery 1, the preferable release pressure in design is a pressure increment of 0.05-1 Mpa over the atmospheric pressure, and more preferably 0.1-0.2 MPa. If the release pressure is very low, even a miner trouble due to, for example, transient large current flow or temporary high temperature causes the inside pressure to be released, leading to malfunction of battery 1. To the contrary, if the release pressure is excessively high, a part of fused portion of film 5 other than through-hole 8 or the sealed areas of the electrode leads might open before the peeled position of films 5 proceeds to through-hole 8, which leads to increased risk such as gas ejection toward unexpected directions.

With the structure of the embodiment, casing film 5 was constructed by laminating films, that is, nylon (25 μm in thickness)/aluminum (40 μm in thickness)/modified polypropylene (15 μm in thickness)/polypropylene (30 μm in thickness). Setting width W of protrusion 5d to 6 mm, and length L to 7 mm, casing film 5 was thermally fused (heating temperature: 190 degrees C., heating time: 2 sec, applied pressure: 1 MPa), and the resultant film was provided for experiment to confirm the progress of peeled position in fused protrusion 5d with the rise of inside pressure. As a result, the peeled edge reached position a in FIG. 5 at the inside pressure of 0.05 MPa, position b at 0.1 MPa, and position c at 0.15

MPa. Accordingly, formation of through-hole 8 so as to contact the peeled position c, as shown in FIG. 5, allows the inside pressure to be released when the pressure rises to 0.15 MPa. Specifically, assuming that the distance from the edge of through-hole 8 to the top end of protrusion 5d is given by d as shown in FIG. 5, if through-hole 8 is located within the range of d=1.5-4 mm, the inside pressure could be released when the release pressure is within the range of 0.1-0.2 MPa.

In the experiment described above, the peeling of films was hardly found under the inside pressure of 0.2 MPa throughout the perimeter of sealing area 5a except the areas of fused protrusion 5d and fused portions on the battery element side at the vicinity of root of unfused portions 7a and 7b. Additionally, in order to verify the effect of a conventional structure disclosed in Japanese Laid-Open Patent Publication No. 10-55792, we have experimented in the same manner as described above with a structure shown in FIG. 8, which will be described later, with a fused protrusion removed. As a result, the peeling of films was hardly found at a narrower fused portion at the top of unfused portions when the inside pressure of 0.2 MPa was applied. This means that the pressure of 0.2 MPa is not enough to release the gas. It is understood from these experiments that, compared with conventionally known pressure release structures having devised shape of fused portion, formation of the stress concentrating portion on the fused portion as in the invention can greatly proceed the peeling of films according to the rise of inside pressure.

As described above, according to the embodiment, by forming peeling stress concentrating portion in casing films 5, the peeling of films advances ahead from the portion with the inside pressure risen, and releases the pressure, and thus this structure does not need to partially weaken the thermo-fusing strength of casing films 5 as in a conventional structure, and therefore does not reduce sealing reliability. Further, the conventional pressure release structure needs to partially weaken the thermo-fusing strength, and therefore it has been difficult to adjust the thermo-fusing strength, but the structure in the embodiment can easily and securely set the release pressure by simply adjusting the position of through-hole 8. Further, the stress concentrating portion functioning as a safety valve allows the peeling of films to greatly advance, which makes it possible to release the inside pressure at a lower value, and also to reduce influence of the positional error of a pressure release part, thereby improving setting precision of release pressure.

It is important in the invention that a stress concentrating portion is formed on sealing area 5a. Therefore, fused protrusion 5d in the embodiment is so formed that sealing area 5a is protruded toward the battery element receiving part. Fused protrusion 5d does not simply protrude toward the battery element receiving part, but fused protrusion 5d is formed utilizing unfused portions 7a and 7b, each having a shape of cove so as to communicate with the battery element receiving part, so that increase in the outer size of film-covered battery 1 due to this formation of protrusion 5d can be limited to a minimum.

It is preferable that protruding length L of protrusion 5d (see FIG. 5) is set so that protrusion 5d does not enter the battery element receiving part as shown in FIG. 2, so as not to reduce volume efficiency of the battery element receiving part relative to the outer size of film-covered battery 1. However, this limitation is not particularly critical, in case that the entering of protrusion 5d into the battery element receiving part is not a problem, or that the fused portions is formed with a space apart from the battery element receiving part, although they are usually formed so as to substantially contact the battery element receiving part, and therefore length L may be set to a slightly larger one.

Casing films 5 in the embodiment have fused prominence 5c as shown in FIG. 2. Resultantly, casing films 5 are securely provided with enough sealing area 5a to seal battery element 2 at the position where unfused portions 7a and 7b are formed, thereby improving the sealing reliability. Additionally, fused prominence 5c has some effects as in the following.

Figure 6:
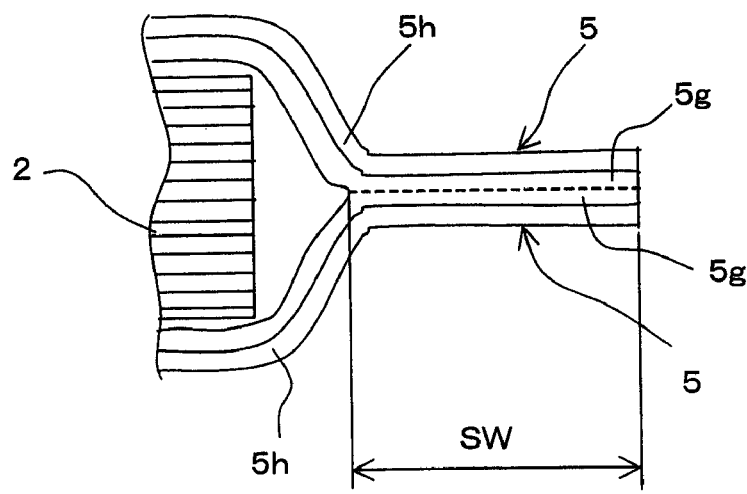
FIG. 6 is a sectional view in a fused area of the casing films.

As shown in FIG. 6, when casing films 5 are thermally fused together, each film having thermo-fusing resin layer 5g and metallic film layer 5h laminated on one another, resin layers 5g are exposed at the edge of casing films 5, and face the battery element receiving part that receives battery element 2. Thermo-fusing resin layer 5g slightly absorbs water contained in the atmosphere, and the water enters the battery element receiving part from the edge of films 5, passing through resin layer 5g. The amount of water entering the receiving part depends on thermally fused width SW. That is, the smaller the fused width SW, the larger amount of water ingress, because of shorter distance between the edge of films 5 and the battery element receiving part. If fused prominence 5c is provided on casing films 5 as shown in FIG. 2, casing films 5 can be thermally fused without reducing the fused width SW, thereby effectively preventing ingress of water contained in the atmosphere.

Figure 7:
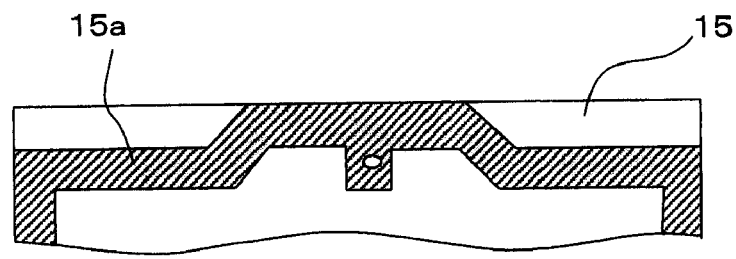
FIG. 7 is a view showing one example pattern of a sealing area when rectangular casing films are used.
Figure 8:
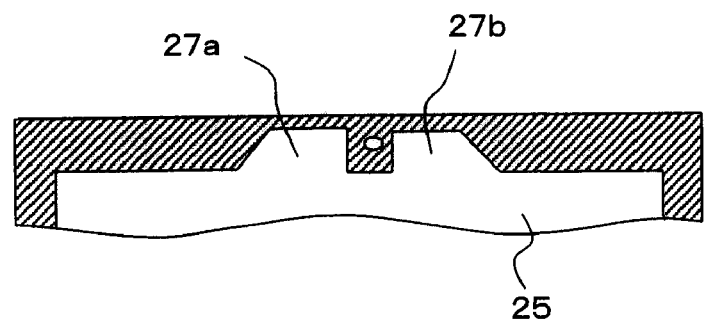
FIG. 8 is a view showing another example pattern of the sealing area when the rectangular casing films are used.

The outer size of film-covered battery 1 becomes larger due to fused prominence 5c, but the outer size does not substantially increase by folding prominence 5c for practical use. When assumed that the casing films may be used with the edge folded, rectangular casing films 15 could be used, as shown in FIG. 7, to form sealing area 15a similar to the shape shown in FIG. 1. In this case, the size of film 15 becomes larger, but process for forming the fused prominence portion would be eliminated. If the increase in the amount of water ingress through resin layer 5g is accepted, there could be used casing films 25 as shown in FIG. 8, which has a shape with a portion corresponding to the fused prominence removed. In this case, thermally fused width becomes narrower, but the amount of films 25 used could be reduced.

Meanwhile, the present invention has an effect that the peeling of films at the stress concentrating portion greatly advances according to the rise of inside pressure, whereby the fused width of an expected gas release portion could be larger than a conventional one. This larger fused width could regulate the ingress of water at the fused area of the expected gas release portion, resultantly. Here, the fused width of the expected gas release portion is distance d from the edge of fused protrusion 5d to the outer edge of through-hole 8 as in FIG. 5 in the invention, and in Japanese Laid-Open Patent Publication No. 2002-5683, for example, it is a residual width of thermally-fused portion when an outer part thereof is cut from the outside. In other words, the fused width of the expected gas release portion is a length of peeling advancing path in a direction from the space on the side of the battery element receiving part to the rim of casing film 5 within a portion functioning as a safety valve, the path lying up to the position where the space on the side of the battery element receiving part is connected to the open air according to the rise of inside pressure.

Figure 9A:
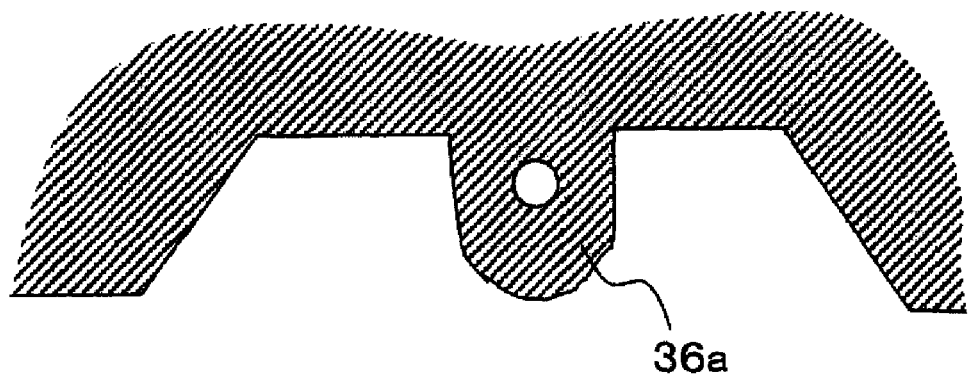
FIGS. 9A to 9C are plan views around unfused portions showing some examples of shapes of the fused protrusion.
Figure 9B:
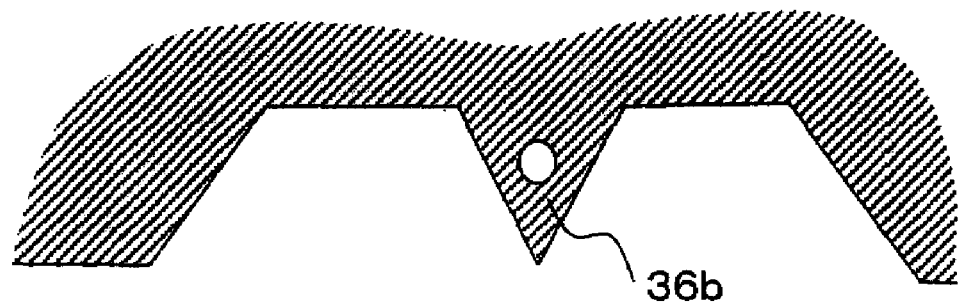
Figure 9C:
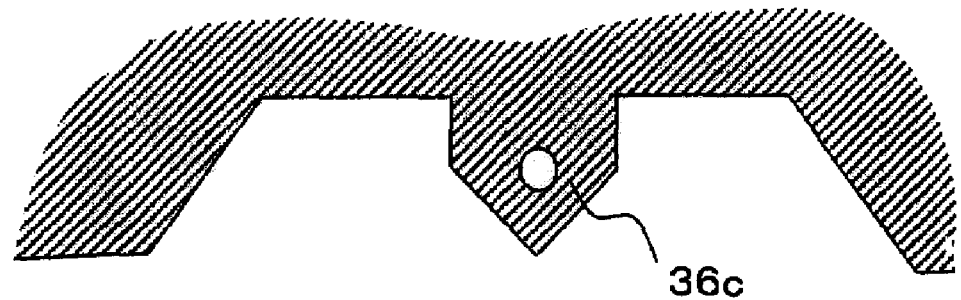

Referring again to FIG. 2, fused protrusion 5d has a rectangular shape in FIG. 2, but any shape may be formed, as long as it protrudes toward the battery element receiving part. Some examples are shown in FIGS. 9A to 9C. Fused protrusion 36a shown in FIG. 9A has an arced top end. An example shown in FIG. 9B has triangular-shaped fused protrusion 36b. Another example shown in FIG. 9C has home-base shaped fused protrusion 36c. In any protrusions 36a, 36b and 36c, not only its top end but also its both sides expand, and resultantly peeling stress acts on the top end and both sides, whereby the peeling stress concentrates on the top potion, and the peeling at the top proceeds in advance of the other fused portions.

Particularly, protrusion 36b of FIG. 9B and protrusion 36c of FIG. 9C, each having a tapering shape with a point end toward the battery element receiving part, are easier for the peeling to proceed from the point end.

Figure 10:
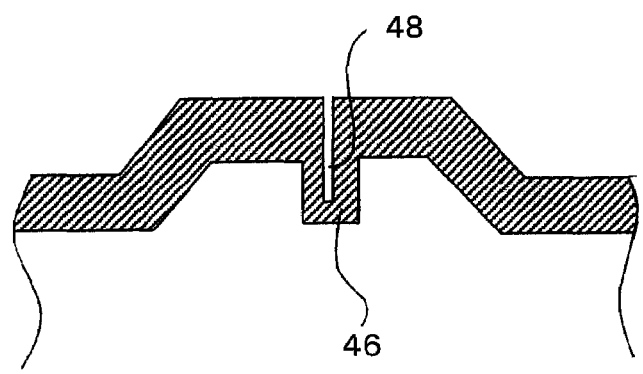
FIG. 10 is a plan view showing the vicinity of the unfused portions with a pressure release part formed by a slit.

The pressure release part in the invention has been a through-hole in the embodiment described above, but the pressure release part is not limited to a through-hole. For instance, slit 48 formed on fused protrusion 46, as shown in FIG. 10, achieves the same effect as that in the above embodiment. In this case, the release pressure can be set arbitrarily by adjusting the top end position of slit 48. The pressure release part is not limited to the structure in which an opening passes through two overlaid casing films, as long as the battery element receiving part can communicate with the outside by the peeling of thermally-fused portion. For instance, a through-hole, a slit or the like could be formed only on one side of two overlaid casing films, which also achieves the same effect.

The stress concentrating portion, it is also not necessary to be provided as a fused protrusion as in above-described examples, as long as the peeling stress is concentrated on a part of a fused portion, and the peeling resultantly progresses in advance of the other portions.

Figure 11:
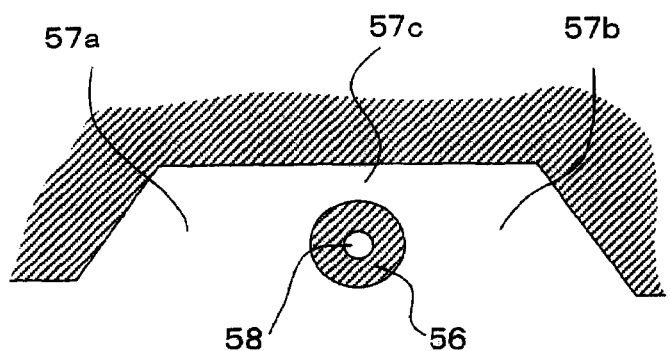
FIG. 11 is a plan view around the unfused portions showing another example of a stress concentrating portion.

FIG. 11 shows another example of the stress concentrating portion according to the invention. In this example, island-shaped fused portion 56 is formed as a stress concentrating portion independent of the other fused portions within an unfused portion having a cove-like shape and opening to the battery element receiving part. This island-shaped fused portion 56 has through-hole 58 as a pressure release part formed inside. This structure may be understood such that island-shaped fused portion 56 is provided inside a unfused portion as described above. However, this structure could be construed from a different point of view such that: two cove-like unfused portions 57a and 57b are provided opening to the battery element receiving part, the unfused portions 57a and 57b are communicated through connection 57c as an unfused portion in the casing film, and resultantly island-shaped fused portion 56 is provided as a stress concentrating portion between two unfused portions 57a and 57b.

With this example, when gas is generated in the battery element receiving part, the generated gas enters two unfused portions 57a and 57b, and connection 57c, which causes the casing films to expand at the entire circumference of the island-shaped fused portion 56. Resultantly, the peeling stress concentrates on island portion 56, whereby the peeling of films progresses in advance of the other portions. The inside pressure is released when the peeled border of the casing films in island portion 56 reaches through-hole 58. The release pressure can be arbitrarily set by adjusting the distance from the rim of island portion 56 to through-hole 58.

Figure 12:
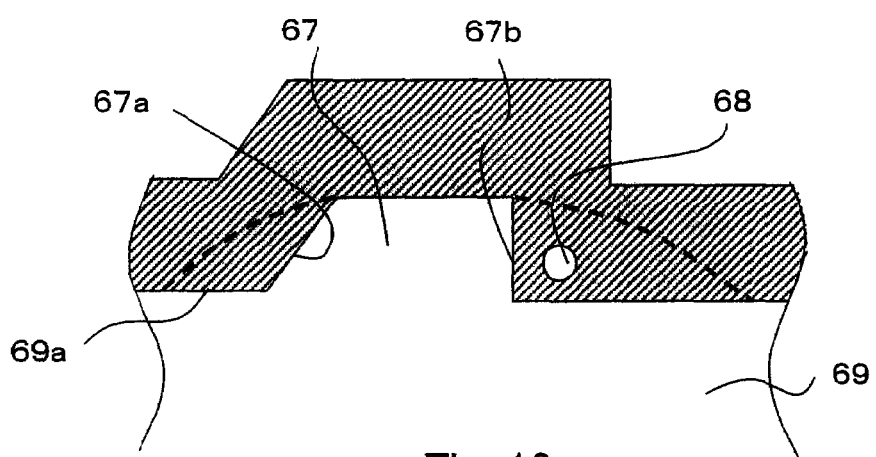
FIG. 12 is a plan view around the unfused portions showing still another example of the stress concentrating portion.

FIG. 12 shows still another example of the stress concentrating portion according to the invention. In this example, there is provided with only one cove-like unfused portion 67 opening to the battery element receiving part. Although only one unfused portion 67 is provided, unfused portion 67 has a shape of cove relative to the battery element receiving part, and each of both sides 67a and 67b has an angle with side 69a along which unfused portion 67 is provided, and therefore each fused area border around its intersection has a convex shape protruding toward the side of the battery element receiving part from the fused area.

At the root portions of unfused portion 67, where both sides 67a and 67b intersect side 69a, peeling stress concentrates on the fused portions of the casing films due to the rise of inside pressure. Accordingly, the peeling at both sides of unfused portion 67 progresses in advance of the other fused portions. In the fused portions at both sides of unfused portion 67, the peeling of both sides 67a and 67b progresses, and the peeling stress concentrates on the sides, at least until both sides 67a and 67b substantially disappear. At this time, a border between the peeled portion and the fused portion forms an arc, as indicated by a broken line in FIG. 12, smoothly connected between the top end of unfused portion 67 and side 69a of battery element receiving part 69. That is, the fused area at the side of receiving part 69 within the broken line corresponds to the stress concentrating portion in the invention.

In this example, through-hole 68 is formed in the fused area at the side of receiving part 69 within the area indicated by the broken line. The release pressure can be arbitrarily set by properly adjusting the position of through-hole 68.

Figure 13:
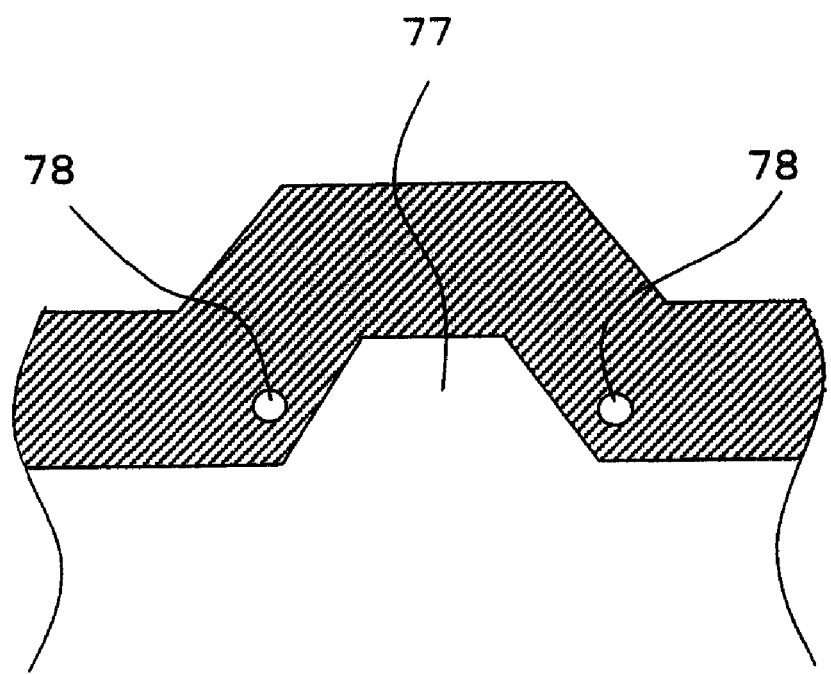
FIG. 13 is a plan view around the unfused portions showing one modification of the example shown in FIG. 12.
Figure 14:
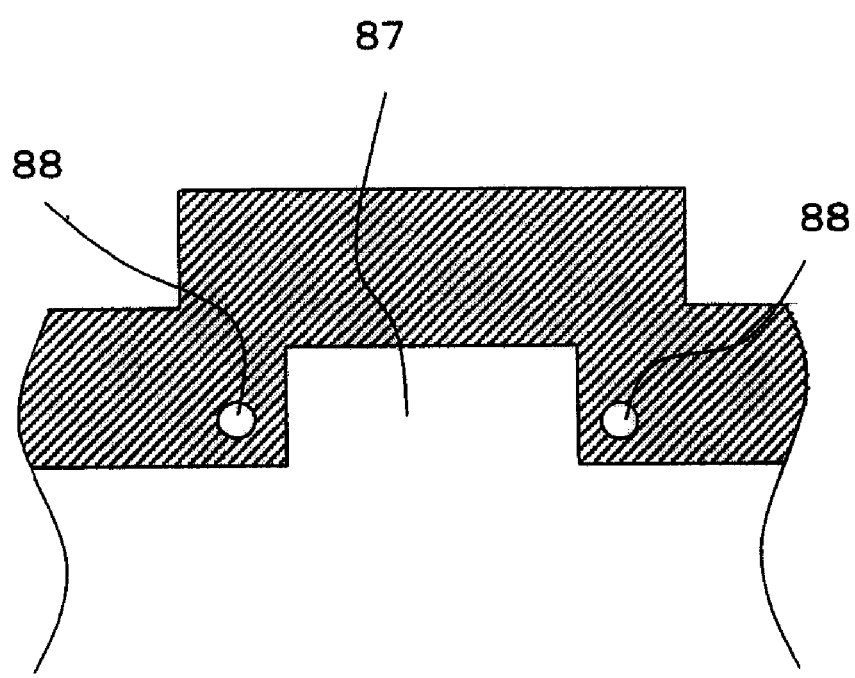
FIG. 14 is a plan view around the unfused portions showing another modification of the example shown in FIG. 12.

The example shown in FIG. 12 has through-hole 68 only at one side of unfused portion 67, but through-holes 78 may be formed in both sides of unfused portion 77, respectively, as shown in FIG. 13. This structure would allow securer pressure release. In this case, though-holes 78 can be provided also within a stress concentrating area. FIG. 14 shows another example in which through-holes 88 may be provided in both sides of unfused portion 87, but differs from the example of FIG. 13 in that the shape of unfused portion 87 is rectangular. As in the above examples, unfused portion 87 could have any shape, as long as it is formed in the shape of cove relative to the battery element receiving part.

Each of FIGS. 11 to 14 shows a structure having a through-hole as a pressure release part, but, as described referring to FIG. 10, the through-hole could be replaced with a slit. Further, the through-hole or the slit may be formed only in one side of overlaid casing films.

It is common to all the examples described above that by effectively acting the peeling stress on the stress concentrating portion, the peeling at the stress concentrating portion is facilitated, which results in securer pressure release. In order to effectively acting the peeling stress on the stress concentrating portion, the unfused portion is preferably so constructed that the gas generated by the battery element receiving part can easily enter. As one means for achieving this feature, at least one side of unfused portion may have a taper shape. This shape has a wide frontage in the unfused portion, which allows the gas generated at the battery element receiving part to easily enter the unfused portion. Another means is that the unfused portion may be provided at the center of a longer side of the battery element receiving part. This position is most appropriate for the casing films to expand with in the areas where the unfused portion can be formed. By providing the unfused portion at this position, the gas generated at the battery element receiving part can easily enter the unfused portion.

The invention has been described with respect to some typical examples. It is to be understood that the invention is not limited to those examples, and that various changes may be made within the technical concept of the invention.

For example, the above-described examples show that a battery element is sandwiched with two casing films from both sides in a thickness direction, and then four sides of peripheries are thermally fused, but as another example, a battery element may be sandwiched by folding a single casing film, and three opening sides are thermally fused to thereby seal the battery element.

As to a battery element, there has been shown a stacked type one in the above example in which a plurality of positive electrode plates and negative electrode plates are alternately stacked, but there may be employed a wound type battery element having alternately arranged positive electrode and negative electrode, which is made by including the steps of forming a stripe of positive electrode plate, negative electrode plate and separator, overlaying the positive electrode plate and the negative electrode plate with the separator sandwiched between them, winding this, and compressing this wound one into flat shape.

Any battery element used in a usual battery may be also applicable to the battery element of the invention, as long as it includes a positive electrode, a negative electrode and an electrolyte. As for the battery element in a generally used lithium-ion secondary battery, a positive electrode plate is opposed to a negative electrode plate via a separator, and then an electrolyte containing lithium salt is impregnated to form the battery element, the positive electrode plate being made by applying positive active material, such as lithium manganese combined oxide or cobalt acid lithium, onto both surfaces of an aluminum foil, and the negative electrode plate being made by applying carbon material, capable of doping/ dedoping lithium, onto both surfaces of a copper foil. There may be also employed, as a battery element, the element of other kinds of chemical battery, such as nickel-metal hydride battery, nickel-cadmium battery, lithium metal primary or secondary battery, and lithium polymer battery. Furthermore, the present invention is also applicable to an electric device in which casing films seal the electric device element that is possible to generate gas by chemical reaction or physical reaction on the electric energy stored inside a capacitor element as represented in an electric double layer capacitor, electrolytic capacitor, or the like.

FIG. 1 shows an example of film-covered battery 1 having positive electrode lead 3 and negative electrode lead 4 extending from opposing sides of the battery, but these leads may be extended from the same side.

Although certain preferred embodiments of the present invention have been shown and described in detail, it should be understood that various changes and modifications may be made without departing from the spirit or scope of the appended claims.

What is claimed is:

1. A film-covered electric device having an electric device element, and a casing film arranged for enclosing said electric device element to seal said electric device element, said casing film comprising:
 a sealing area formed by thermally fusing the facing surfaces of said casing film together throughout the perimeter of said casing film around the periphery of said electric device element;
 an electric device element receiving part formed inside said sealing area as a space for encapsulating said electric device element;
 at least one unfused portion communicating with said electric device element receiving part, and having a cove shape that opens to said electric device element receiving part;
 a sealed stress concentrating portion touching said unfused portion and which concentrates the peeling stress of said casing film, the peeling stress being generated by the expansion of said electric device element receiving part according to the rise of inside pressure of said electric device element receiving part; and
 a pressure release part formed within said sealed stress concentrating portion for opening the inside of said electric device element receiving part to the outside thereof by peeling said casing film at said sealed stress concentrating portion.

2. The film-covered electric device according to claim 1, wherein said sealing area is formed protruding away from said electric device receiving part where said unfused portion is provided.

3. The film-covered electric device according to claim 1, wherein said pressure release part is a hole or a slit formed at least in one side of said casing film overlaid at said stress concentrating portion.

4. The film-covered electric device according to claim 1, wherein two unfused portions are provided in spaced relationship with each other along the periphery of said sealing area, and said sealed stress concentrating portion is located between said two unfused portions.

5. The film-covered electric device according to claim 4, wherein said sealed stress concentrating portion is formed as a fused protrusion protruding toward said electric device element receiving part from said sealing area positioned outside said two unfused portions.

6. The film-covered electric device according to claim 5, wherein said fused protrusion has a shape tapering toward said electric device element receiving part.

7. The film-covered electric device according to claim 1, wherein said pressure release part is so positioned that, when the inside of said electric device element receiving part opens to the outside, the inside pressure of said electric device element receiving part increases over the atmospheric pressure by 0.1 to 0.2 MPa.

8. The film-covered electric device according to claim 1, wherein said electric device element is a chemical battery element or a capacitor element.

9. The film-covered electric device according to claim 1, wherein said at least one unfused portion has a taper shape.

10. The film-covered electric device according to claim 1, wherein a total length of portions where said unfused portions abut said electric device element receiving part is shorter than an inside length of casing film at a side wherein said unfused portions are formed.

11. The film-covered electric device according to claim 1, wherein portions where said unfused portions abut said battery element receiving part are separated a distance from sides of said electric device element receiving part that are adjacent to a side of said electric device element receiving part on which said unfused portions are formed.

12. The film-covered electric device according to claim 1, wherein intersection points are formed where sealed sides defining said cove shape meet a side of said unfused portion that opens to said electric device receiving part.

* * * * *